Oct. 12, 1954  C. T. FLORA  2,691,715
ARC WELDER CONTROL
Filed May 28, 1952  2 Sheets-Sheet 1

Fig. 1

Inventor
Clifford T. Flora
By Wayne Morris Russell
Attorney

Oct. 12, 1954

C. T. FLORA 2,691,715

ARC WELDER CONTROL

Filed May 28, 1952

Inventor
Clifford T. Flora
By Wayne Morris Russell
Attorney

Patented Oct. 12, 1954

2,691,715

UNITED STATES PATENT OFFICE 2,691,715

ARC WELDER CONTROL

Clifford T. Flora, Michigan City, Ind., assignor to Pullman-Standard Car Manufacturing Company, Chicago, Ill., a corporation of Delaware Application May 28, 1952, Serial No. 290,476

22 Claims. (Cl. 219—8)

The present invention relates to the control of alternating current arc welding machines, and more particularly to means for obtaining a weld of uniform predetermined characteristics by maintaining in substantially fixed predetermined relation the rates of feed, of travel relative to the work, and of fusion of the electrode in an A. C. arc welder.

Two forms which the invention may assume are illustrated in the drawings. In each form, direct current motors are employed to operate the electrode feeding means and the means for effecting relative travel of the electrode and work, and these motors are actuated by direct current, or more precisely unidirectional current, derived from the alternating current supplying the welding current, by means of suitable rectifiers the input sides of which are connected to the alternating current source in the same phase as the welding current transformer. Thus any variations in the welding current due to fluctuations in the alternating current supply are accompanied by simultaneous and corresponding variations in the direct current, and the speeds of the motors change with the welding arc. The relation of the rates of fusion, feed, and travel of the electrode may therefore be adjusted on the basis of the normal welding current to obtain the desired characteristics of the weld, and the relation maintained substantially constant regardless of fluctuations in the alternating current supply. In both forms, suitable relays and other switch means are provided to control the operation of the machine automatically during a welding operation, including means to effect automatic reestablishment of the arc if it is extinguished for any reason. In one form, a first rectifier is connected across the secondary of the welding transformer, and second and third rectifiers are connected to the secondary of an auxiliary transformer connected to the alternating current supply in the same phase as the welding transformer. The first rectifier actuates the armature of the feed means operating motor during welding operation, while the second actuates the travel means operating motor and excites the feed means motor field. The third rectifier actuates the feed means motor armature, through manual switches, for initial feeding of the electrode toward the work preliminary to the striking of the arc, and also through automatically operating switches causes feeding of the electrode to the work for reestablishing the arc in the event of its extinguishment during the welding operation. In another form, only two rectifiers are employed, the first being connectible by automatic switch means to either the welding transformer secondary or the auxiliary transformer secondary so that it may perform the functions of both the first and third rectifiers of the other form of the invention. The second rectifier functions in the same way as the second rectifier in the other form.

Practically all variations of welding current are due to fluctuations in the alternating current supply, which cannot very well be controlled, while internal factors in the machine which might result in such variations are normally eliminated by control elements of the machine itself. The invention therefore provides a simple but most effective control for maintaining the rate of feed and the rate of travel of the electrode in a predetermined and substantially fixed relation to its rate of fusion, these being the three factors which determine the characteristics of a given weld. By initially adjusting the speeds of the motors in relation to a given value of the welding current, the same relation is assured for variations of the welding current from that value because both the alternating welding current and the direct current for the motors are derived from the same alternating current supply and will vary simultaneously and correspondingly. The direct current motors respond instantly to changes in the direct current, so that there is no appreciable lag between a change in the arc and a corresponding change in the motor speeds. The result is the production of a weld which is substantially uniform throughout its extent, with the weld characteristics which were predetermined by preliminary adjustment of the relation between the electrode feed and travel rates and the rate of electrode fusion at a given welding current value. The invention also provides for automatic reestablishment of the arc by means of the arrangement already described and without necessitating any action by the operator, so that the welding operation will be resumed quickly if the arc is extinguished, with the same relation existing between the electrode feed and travel rates and the welding current as before.

It is an object of the invention to assure production of uniform welds of predetermined characteristics by alternating current arc welding machines.

Another object is the provision of means for maintaining the rates of fusion, feed, and travel of a welding electrode in a predetermined substantially fixed relation throughout the welding operation of an alternating current arc welding machine to obtain a uniform weld of predetermined characteristics.

Another object is the provision of means to maintain the rates of feed and of travel relative to the work of a welding electrode of an alternating current arc welding machine in substantially fixed predetermined relation to the welding current value so as to obtain a uniform weld.

Another object is the provision of direct current motors to operate feed means and travel means of an alternating current arc welding machine electrode and actuated by direct current derived from the same source and in the same phase as the welding current so as to maintain the electrode feed and travel rates in substantially fixed predetermined relation to the welding current and hence to the fusion rate of the electrode.

It is another object to provide means in an alternating current arc welding machine for maintaining in substantially constant relation the rates of fusion, feed, and travel of the eletrode throughout a welding operation so as to effect a uniform weld.

Another object is the provision, in an alternating current arc welding machine in which welding current is derived from a source of alternating current supply, of means controlling in predetermined relation to the welding current the rates of feed and travel relative to the work of the electrode by direct current derived from the same source and in the same phase as the welding current.

Another object is the provision of direct current motors in an alternating current arc welding machine to drive means for feeding the electrode and means for causing relative travel of the electrode and work actuated by direct current derived from the same source and in the same phase as the welding current, so that the electrode feed and travel rates are maintainable in predetermined substantially fixed relation to the welding current.

It is a further object of the invention to provide an alternating current arc welding machine having means for maintaining in substantially constant relation the rates of fusion, feed, and travel of the electrode throughout a welding operation to effect a uniform weld.

Another object is the provision of an alternating current arc welding machine having means which derive direct current from the source of alternating current supplying the welding current to operate electrode feed means and travel means at speeds in substantially fixed relation to the welding current for effecting a uniform weld.

A further object of the invention is the provision of means for automatically reestablishing the welding arc in an alternating current arc welding machine upon extinguishment thereof during welding operation.

Another object is the provision of an alternating current arc welding machine having means for feeding the electrode to the work for establishing a welding arc in which the means are automatically operated to restore an extinguished arc during welding operation of the machine.

Other and further objects, advantages, and features of the invention will be apparent to those skilled in the art from the following description together with the accompanying drawings, in which.

Figure 1:
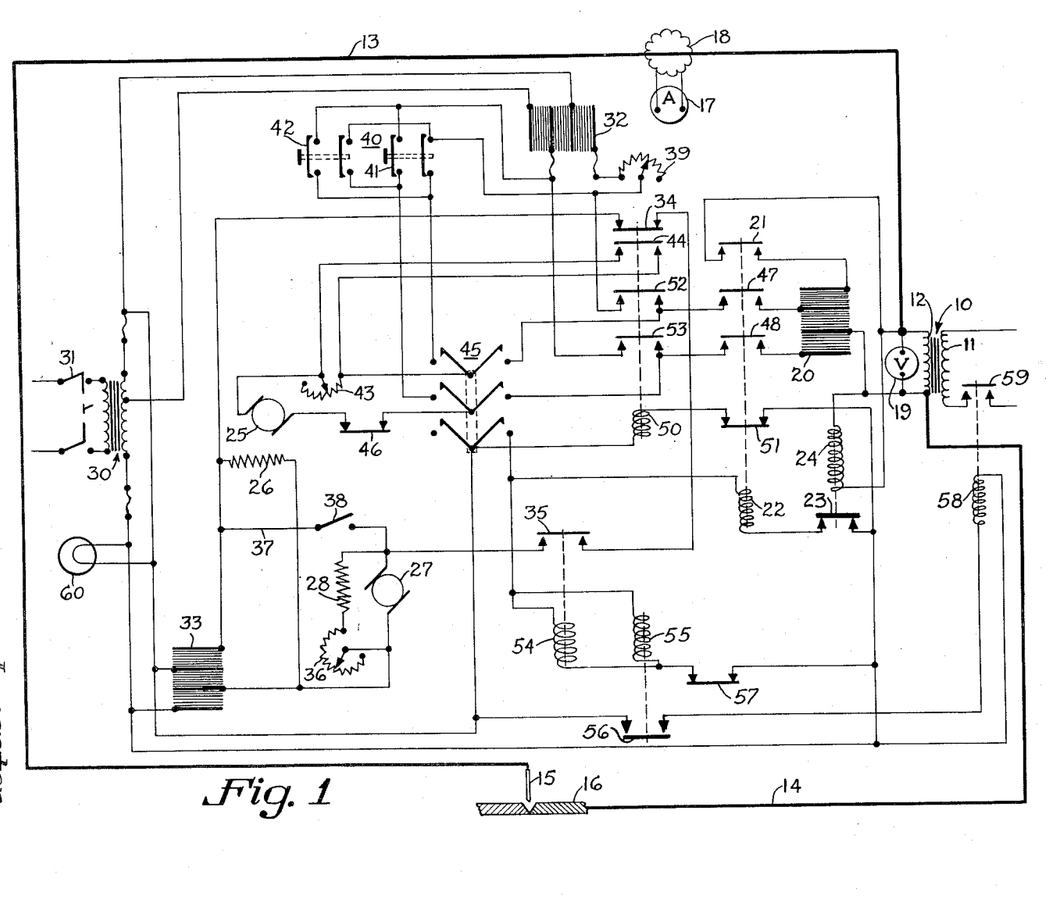
Fig. 1 is a circuit diagram illustrating one form of the invention.

Referring first to the form shown in Fig. 1, the invention is illustrated as incorporated in an alternating current arc welding machine having a welding transformer 10 with a primary 11 connected to a suitable source of alternating current and a secondary 12 which has welding leads or cables 13 and 14 connected respectively to an electrode 15 and the work 16 in which a weld is to be made by the electrode and which serves as a ground in the usual manner. An ammeter 17 is arranged for energization by the lead 13 by means of a doughnut type induction coil 18, and a voltmeter 19 is connected across the transformer secondary 12, or in other words across the leads 13 and 14, so that the operator may know at all times the voltage and strength of the welding current. A rheostat (not shown) may be suitably connected in the circuit for controlling the welding current. A rectifier 20, shown as a selenium rectifier but which may be of any desired type, is also connected across the secondary 12 through a switch 21 operable simultaneously with other switches later described by a main relay 22 which is controlled by a switch 23 operated by a high-low voltage relay 24. The relay 24 is connected to the welding transformer secondary to be energized thereby at all times when the transformer 10 is operative, but is constructed to operate to open switch 23 when the voltage of the welding current rises above a given value, and to close or leave closed the switch 23 when the welding voltage is below such value. The critical value is preferably somewhat higher than the predetermined normal welding current voltage for a given welding operation. By this arrangement, the main relay is deenergized to open switch 21 and remove the rectifier 20 from the circuit when the welding voltage rises too high, and is energized to close the switch when the voltage is below the critical value so as to keep the rectifier in the circuit or return it thereto.

The machine is of a common type having an automatic welding head mounted on a carriage so that it may be moved along the desired line of weld on the work and having means for continuously feeding the electrode toward the work as it is consumed in the arc while moving along the weld line, so that the arc is maintained substantially constant. The travel of the electrode along the work may be relative, that is, the electrode may be held at a given point and the work moved past it, the effect being the same. Apparatus of this type is well known in the welding art and need not be described in detail, but it may be pointed out that difficulty is encountered in obtaining a uniform weld because fluctuations in the alternating current supply cause corresponding fluctuations of the welding current resulting in arc variations, or in other words in the rate of consumption or fusion of the electrode, while the rates of feed and relative travel of the electrode are not simultaneously and correspondingly varied. The characteristics of the weld, as for example the depth of penetration and the size and shape of the bead, are determined by the relation of the electrode fusion, feed, and travel rates. The feed and travel speeds can be held fairly constant by present equipment, and the fusion rate can also be generally held steady so far as internal machine factors are concerned, but hitherto there has been no simple, inexpensive and effective way to overcome the effects of welding current variations due to fluctuations of the external alternating current supply. Since such fluctuations can hardly be prevented, the alternative is to fix the relation among the factors, and as a practical matter this means relating the feed and travel rates to the fusion rate, which is the variable. This is accomplished by the present invention by employing direct current motors to drive the feed and travel means, and deriving the motor operating current from the same alternating current supply as the welding current, and in the same phase, so that alternating current fluctuations are reflected simultaneously and correspondingly in the motor speeds and the arc and the relation of the fusion, feed, and travel rates of the electrode accordingly is maintained substantially constant.

A direct current motor having an armature 25 and a field 26 is provided for driving the electrode feeding means, and a similar direct current motor with an armature 27 and a field 28 is employed to operate the means for effecting relative travel of the electrode and the work. The primary of an auxiliary transformer 30 is connected through a switch 31 to the same source and in the same phase as the welding transformer primary 11. The secondary of transformer 30 is tapped for connection to the input side of a rectifier 32 similar to rectifier 20, and is also connected to another rectifier 33. For convenience, the rectified unidirectional current provided by the rectifiers is referred to as direct current. The armature 27 of the travel motor is connected to the output side of rectifier 33 through a switch 34 and a timing switch 35, the field 28 being in shunt with the armature and in series with a rheostat 36 by which the motor speed may be adjusted. A line 37 is provided between the rectifier and motor to by-pass switches 34 and 35 and has a normally open manually operable switch 38 therein, so that the motor may be operated to drive the travel means when either or both of the switches 34 and 35 are open. The field 26 of the electrode feed motor is also connected to the rectifier 33 for excitation by the current supplied therefrom, and is in constantly closed circuit relation therewith so as to be excited at all times when the rectifier is operative. The feed motor armature 25 is arranged to be connected to the rectifier 32 during the preparation of the machine for welding, and to rectifier 20 during the actual welding operation.

Connected to the output side of rectifier 32 through an electrode feed rheostat 39 is a manual inching switch generally designated 40 comprising an inch-down switch 41 and an inch-up switch 42 adapted to permit current flow to the feed motor armature 25 in one direction or the other through a circuit including a voltage control rheostat 43 having a switch 44 arranged in shunt therewith and a three-pole double-throw main switch 45 shown as a manually operable switch, although it may be of any suitable type. This switch has two closed positions and an intermediate open or off position. In its first closed position, switch 45 connects the armature 25 to the rectifier 32, the switch 44 being closed and providing a current path around the high resistance of rheostat 43. Only two of the poles of switch 45 are required in this position. In the second closed position, the same two poles connect the feed motor armature for actuation by rectifier 20 through a circuit arrangement described hereinafter, and the other pole connects circuit control means to the secondary of auxiliary transformer 30. The switches 41 and 42 are reversely connected in the inching circuit so that by closing the inch-down switch 41 the feed motor is operated to drive the feed means for feeding the electrode 15 toward the work 16, and by closing the inch-up switch 42 the motor is driven in the opposite direction to move the electrode away from the work. The electrode may thus be brought to a desired position relative to the work for initiating the welding arc, as for example into direct contact with the work. A normally closed limit switch 46 adapted to be opened when the end of the weld is reached is arranged in the circuit of the feed motor to stop feeding of the electrode at the end of the weld.

The connection of the electrode feed motor armature 25 to the output side of rectifier 20 is made through the main switch 45 in its second closed position, in which the inching circuit is broken, and a pair of switches 47 and 48 mounted for opening and closing by the main relay 22 simultaneously with the switch 21. The main relay 22 is connected through its switch 23 and the third pole of main switch 45 across the secondary of transformer 30, and thus is energized when the switch 23 is closed and the main switch is in its second closed position. A switching relay 50 is connected to the secondary of auxiliary transformer 30 through a switch 51 also operated by main relay 22 simultaneously but in oppositely opened and closed relation with switches 21, 47, and 48, so as to be energized during operation of the transformer 30 except when relay 22 is energized to open the switch 51. Operation of switching relay 50 opens and closes switches 34 and 44 simultaneously but in opposite relation so that one is open when the other is closed. The rectifier 32 is connectible to the feed motor armature 25, in place of the rectifier 20, through the main switch 45 in its second closed position, rheostat 39, and a pair of switches 52 and 53 which are suitably mounted for operation by switching relay 50 to open and close simultaneously with switch 44. It will be seen that when the main relay 22 is energized to close the switches 47 and 48, connecting the rectifier 20 with the feed motor, the switching relay 50 is deenergized and the switches 52 and 53 are open, while when the main relay is deenergized and the switches 47 and 48 are open to disconnect the motor from rectifier 20, the switching relay is energized and closes the switches 52 and 53 to connect rectifier 32 to the motor. By this arrangement, if the arc is extinguished during the welding operation, it will be automatically reestablished, the high open circuit voltage of the transformer 10 operating relay 24 to deenergize relay 22 and thus transfer the feed motor to rectifier 32 so that the electrode is moved slowly into contact with the work to strike an arc, whereupon the welding voltage drops below the critical value and relay 24 operates to energize the main relay again, restoring the circuit to its condition prior to extinguishment of the arc. During operation of the feed motor from rectifier 32, the switch 34 is open and the travel motor is stopped so that the arc interruption does not result in a break in the weld. If an arc is not generated when the electrode contacts the work, the travel motor is restarted automatically to scratch the electrode on the work and initiate the arc.

A time delay relay 54 operating the timing switch 35 of the travel motor, and a time delay relay 55 operating a normally open switch 56, are connected across the secondary of transformer 30 through the third pole of the main switch 45 in its second closed position and a travel limit switch 57, in parallel to the main relay 22. A welding contactor relay 58 is connected with the transformer 30 secondary through the switch 56 and operates a transformer switch 59 through which the primary 11 of welding transformer 10 is connected to the alternating current source. The relay 54 is of the type having its action delayed after energization so as to close the switch 35 for actuation of the travel motor only after a predetermined interval following the closing of the circuit through the relays, but acting instantaneously upon opening of the circuit to open the switch. The relay 55 is of the type which delays its action after deenergization so as to hold the switch 56 closed for a predetermined period after the relay circuit is opened, but closing the switch immediately upon closing of the relay circuit. The circuit through the welding contactor relay 58 thus is deenergized only after such period to open transformer switch 59 and thereby stop the welding current. The circuit through relays 54 and 55 may be broken either by moving the main switch 45 from its second closed position or by opening limit switch 57, which is normally closed and is automatically opened when the desired relative travel of the electrode and work has been accomplished, being mounted, for example, on the carriage in a well-known manner. The feed motor limit switch 46 may similarly be arranged for operation in a known manner. Of course, a single limit switch appropriately located may be used to stop both motors at the end of the weld. A suitable indicating lamp 60 may be provided in the circuit of the auxiliary transformer secondary to indicate when it is energized.

The circuit of Fig. 1 is shown in its normal or idle condition, the main switch 45 and transformer switches 31 and 59 being open. To begin the welding operation, the main switch 45 is moved to its first closed position and switch 31 is closed, energizing the switching relay 50, which opens the travel motor switch 34 and closes switches 44, 52, and 53, and also energizing rectifiers 32 and 33 and through the latter the field 26 of the feed motor, but leaving the other relays deenergized. The travel motor is thus not actuated, since the switch 35 is open, but the feed motor can be actuated by connection of its armature 25 to rectifier 32 through inching switch 40. By manipulation of the inch-down and inch-up switches 41 and 42, the motor is caused to run in one direction or the other and drive the feed means to feed the electrode 15 toward or from the work 16 until the desired position is reached, ordinarily with the electrode in light contact with the work. The adjustment of the feed rheostat 39 is such as to give a slow motor speed, so that the electrode is fed slowly and is more readily controlled. The voltage control rheostat 43 is shunted out by the switch 44, since the current path through the switch offers less resistance than the path through the rheostat. With the electrode in contact with the work, the main switch 45 is thrown over to its second closed position, the two poles which in the first closed position provided a circuit through the inching switch 40 and armature 25 now connecting the armature to the rectifier 20 through switches 47 and 48, and the third pole closing the circuits through the main relay 22 and its control switch 23, and through the relays 54 and 55. Energization of main relay 22 effects opening of the switching relay switch 51 and closing of the rectifier switch 21 and of switches 47 and 48. The opening of switch 51 causes deenergization of switching relay 50 to close the travel motor switch 34 and to open switches 44, 52, and 53, so that the feed motor armature 25 is in closed circuit relation with the rectifier 20. At the same time, the welding contactor relay 58 is energized by closing of switch 56 by relay 55 and closes switch 59 to connect the transformer 10 to the alternating current source, so that it is energized to pass welding current through the electrode and work and initiate a welding arc therebetween, and also to supply current to the rectifier 20 for actuation of feed motor armature 25. If an arc is not promptly generated, that is before the time delay relay 54 closes the timing switch 35, the travel motor will start upon closing of switch 35 and cause a scratching action between the electrode and work and thus strike the arc. The arc quickly reaches its maximum, determined by the value of the welding current, and is stabilized by the feeding of the electrode at the proper rate to maintain the desired arc, while travel of the electrode relative to the work along the desired line of weld is effected at a predetermined rate by the travel motor. The speeds of the feed and travel motors are adjusted by the rheostats 43 and 36 respectively in accordance with the normal welding current to be provided by the welding transformer 10, so that the rates of feed and relative travel of the electrode are set or substantially fixed in relation to the normal fusion rate of the electrode, which depends upon the normal welding current. The relation among the fusion, feed, and travel rates of the electrode is such as to produce a weld of the desired characteristics. As long as the welding current does not deviate substantially from its normal value, the direct current from the rectifiers does not vary appreciably, and the motors will maintain their adjusted speeds, so that the feed and travel rates remain constant. As already pointed out, the welding current as a practical matter changes only as the result of fluctuations of the alternating current supply to the transformers. If the alternating current changes to raise the welding current value above normal, the direct current to the feed and travel motors is also increased in such proportion as to increase the motor speeds simultaneously and correspondingly with the welding current, and the electrode feed and travel are speeded up to remain in balance with the faster fusion of the electrode, the desired weld characteristics being thus maintained. The reverse occurs if the alternating current causes the welding current to drop below its normal value, the electrode feed and travel rates being slowed to correspond to the slower rate of fusion, again keeping these rates in balance. In other words, the relation of the fusion, feed, and relative travel rates of the electrode 15 is held substantially constant throughout the welding operation regardless of deviations of the welding current due to the alternating current fluctuations, because both the welding current which determines the rate of electrode fusion and the direct current governing the speeds of feed and travel of the electrode are derived from the same alternating current source in the same phase and therefore respond correspondingly to fluctuations thereof.

In the explanation of the operation of the machine just given, it was assumed that the electrode 15 was in contact with the work when the main switch 45 was moved to its second closed position to start the welding operation, so that the voltage of secondary 12 is minimum and the amperage maximum. If the electrode is positioned by means of the inching switch 40 so as to be spaced somewhat from the work, the movement of switch 45 to the second closed position will momentarily energize the main relay 22 to cause deenergization of switching relay 50 to effect actuation of feed motor armature 25 by rectifier 20, but the main relay 22 is immediately deenergized by operation of the high-low voltage relay 24 to open the switch 23, resulting in energization of switching relay 50. The operation of relay 24 is effected by the open circuit or maximum voltage in the welding transformer secondary 12, resulting from the gap between the electrode and work, such voltage of course being above the critical value at which the high-low relay operates to open switch 23. The consequent deenergization of main relay 22 opens switch 21 to disconnect rectifier 20 from the secondary 12, and also opens switches 47 and 48 to disconnect feed motor armature 25 from rectifier 20, protecting the feed motor against excessive voltages. At the same time, energization of the relay 50 through now-closed switch 51 closes the switches 44, 52, and 53 and opens switch 34. The rectifier 32 is thus connected to the armature 25 through rheostat 39, switches 52 and 53, the first two poles of main switch 45, and switch 44 which by-passes the rheostat 43. The feed motor is driven in a direction to feed the electrode 15 toward the work 16, it being noted that the connection of the rectifier 32 through switches 52 and 53 correspond to those through the inch-down switch 41 when switch 45 is in its first closed position. When the electrode contacts the work, the voltage of secondary 12 of the welding transformer drops substantially to zero, and the high-low voltage relay 24 therefore operates to close the switch 23 and cause energization of main relay 22 and deenergization of switching relay 50. An arc is initiated, the feed motor armature 25 is actuated by rectifier 20, and the travel motor is actuated by rectifier 33, all in the manner already described, and the welding operation proceeds as explained. In case the arc is extinguished during the welding operation for any reason, it opens the welding circuit so that the welding current voltage becomes maximum, and the high-low relay 24 operates to cause actuation of the feed motor armature from rectifier 32 instead of rectifier 20, and to stop the travel motor, and the arc is reestablished by the same means and in the same way as described in connection with initial establishment of the arc when a gap exists between the electrode and work.

When the carriage reaches the end of its travel, which is determined by adjustment of the limit switch 57, both the feed motor limit switch 46 and the carriage travel limit switch 57 are opened and both motors stopped, so that feeding of the electrode 15 and movement thereof along the weld line cease. The feed motor is stopped directly by the opening of the limit switch 46 in its circuit, while the travel motor is stopped by opening of the timing switch 35 instantly upon denergization of its relay 54 resulting from opening of the limit switch 57. The welding current is not immediately interrupted, however, because the time delay relay 55 keeps the switch 56 closed for an appreciable interval after opening of limit switch 57, and the welder contactor coil 58 consequently remains energized for such interval to hold the contactor or switch 59 in position closing the welding circuit until the predetermined time lag of relay 55 ends and switch 56 opens to deenergize the coil 58. The arc is thus maintained for a time after the feeding and traverse of the electrode relative to the work has stopped, so that the electrode is burned away to be free of the weld and weld metal is deposited in the hollow at the end of the weld.

Figure 2:
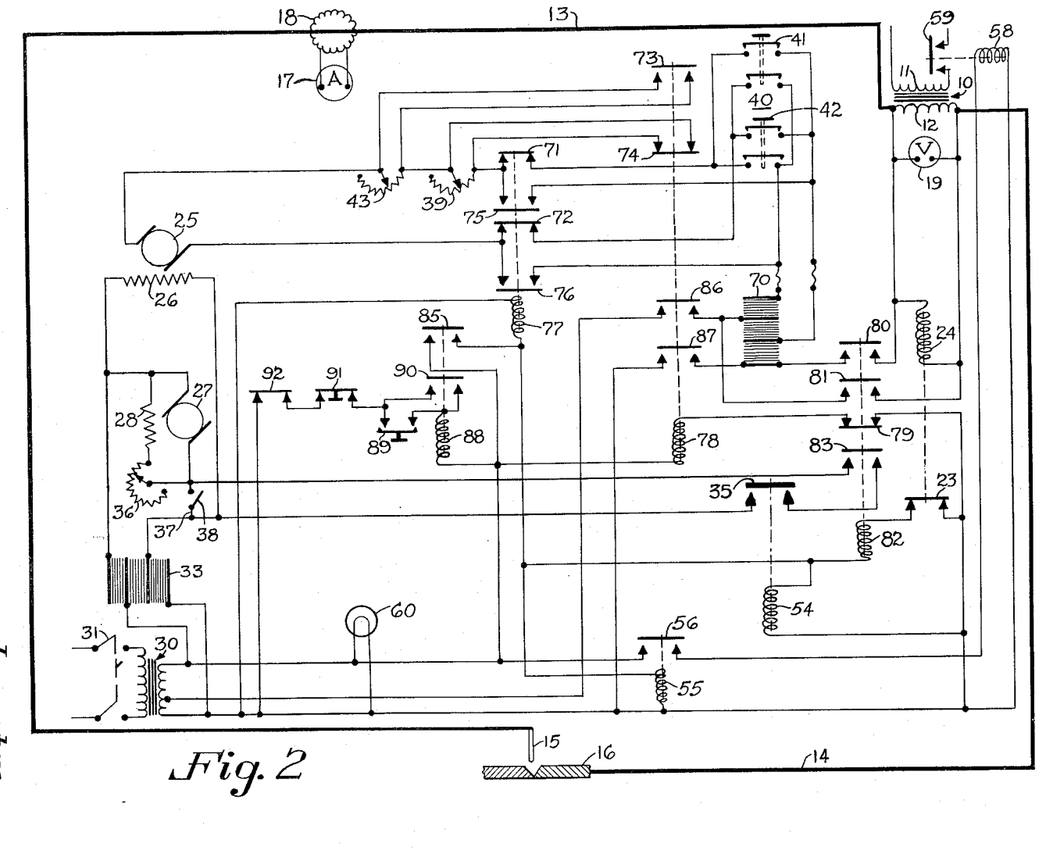
Fig. 2 is a circuit diagram illustrating another form of the invention.

The form of the invention illustrated in Fig. 2 is very similar to that shown in Fig. 1, differing primarily in the use of only two rectifiers, one of which is arranged for connection to either the welding transformer secondary or the auxiliary transformer secondary so that it may perform the functions of both rectifier 20 and rectifier 32 of the first form, and in the use of a somewhat different relay arrangement for effecting the alternative connection of the rectifier to one or the other transformer. Substantially identical elements of the two forms are designated by the same reference numerals in both figures of the drawings.

Referring specifically to Fig. 2, the circuit is shown to include the welding transformer 10 with its primary 11 connectible to a source of alternating current supply through the switch 59 operated by welding contactor relay 58 controlled by switch 56 of the time delay relay 55 energizable by the secondary of auxiliary transformer 30 through a switch later described. The primary of transformer 30 is connected through switch 31 to the same source and in the same phase as the welding transformer primary 11. The time delay relay 54 operating timing switch 35 in the travel motor circuit is connected in parallel to the relay 55. Rectifier 33 is connected to the auxiliary transformer secondary, and the travel motor armature 27 and its shunt field 28 are connected to the output side of the rectifier through switch 35 and another switch in series therewith, corresponding generally to switch 34 and described hereinafter. A manual switch 38 in a line 37 by-passing these switches is provided as in the first-described form of the invention. The field 26 of the electrode feed motor is connected to the rectifier 33 for constant excitation thereby. The welding transformer secondary 12 is connected by the leads 13 and 14 to the electrode 15 and work 16, and ammeter 17 and voltmeter 19 are provided as in the circuit of Fig. 1. The high-low voltage relay 24 is connected across secondary 12 to operate switch 23 in the same manner as in the first-described form of the invention. The indicating lamp 60 is provided as before.

A rectifier 70 is substituted for the rectifiers 20 and 32 of Fig. 1, and has its output side connected to the electrode feed motor armature 25 for actuation thereof through inching switch 40 comprising inch-down switch 41 and inch-up switch 42, switches 71 and 72 each arranged for series connection with one pole of either switch 41 or switch 42, electrode feed rheostat 39, and a switch 73 by-passing the voltage control rheostat 43, a similar switch 74 being provided for by-passing rheostat 39. Alternatively, the rectifier 70 and armature 25 are connected through switches 75 and 76 by-passing the inching switch 40, switch 74 by-passing rheostat 39, and rheostat 43, the switches 75 and 76 being arranged to open when switches 71 and 72 close, and vice versa, and the switches 73 and 74 being similarly arranged to open and close oppositely relative to each other. The switches 71, 72, 75, and 76 are arranged for simultaneous operation by a feed control relay 77 connected to the secondary of transformer 30, and the switches 73 and 74 are operable by a switching relay 78 also connected to the auxiliary transformer secondary through a switch 79. The input side of rectifier 70 is alternatively connectible to the welding transformer secondary 12 or the auxiliary transformer secondary. Connection of the rectifiers to secondary 12 is effected through a pair of switches 80 and 81 operable by a main relay 82 which is in series with the switch 23 and thus controllable by the high-low relay 24, the relay 82 also operating the switch 79. The previously mentioned switch in the travel motor operating circuit in series with timing switch 35, designated 83, is also operated by main relay 82. The switches, 80, 81, and 83 are operated to open and close together, while switch 79 opens when the other three close and closes when they are opened. The relays 54, 55, 77, and 82 are arranged to be energized by transformer 30 upon closure of operating switch 85, with relay 58 being energized upon closing of switch 56 by energization of relay 55, while the switching relay 78 is energized at all times when the secondary of auxiliary transformer 30 is operative except upon opening of switch 79. Connection of rectifier 70 to the secondary of transformer 30 is made through a pair of switches 86 and 87, the secondary being suitably tapped to supply relatively low voltage current to the rectifier. The switches 86 and 87 are operated by switching relay 78 to open and close simultaneously with the switch 73 and in opposition to switch 74.

An operating relay 88 is provided to operate the switch 85, closing the switch when energized and opening it when deenergized. This relay is connected across the auxiliary transformer secondary through a manual push-button starting switch 89 and holding switch 90 in parallel therewith, a manual stop switch 91, and a limit switch 92. The holding switch 90 is operated by relay 88 together with the operating switch 85, serving to keep the energizing circuit through the relay closed after initial energization thereof by means of the starting switch 89. The stop switch 91 and limit switch 92 are located so as to break the circuit through relay 88 when either is opened, releasing the holding switch 90 and simultaneously opening the operating switch 85. The limit switch 92 is similar to and replaces both of the limit switches 46 and 57 of the circuit shown in Fig. 1, and like them is arranged to be opened automatically by the machine parts when the end of the weld is reached. Obviously, the switches 46 and 57 may be used instead of switch 92, and a suitable manual switch may replace the switches 89 and 90.

The operation of the invention as illustrated in Fig. 2 is generally similar to that of the arrangement shown in Fig. 1, but differs somewhat due to the differences described above. With the parts in the idle or normal condition of Fig. 2, the switch 31 is closed, energizing the switching relay 78 to close switches 86 and 87 for feeding alternating current to the rectifier 70 from the low voltage tap connections of the auxiliary transformer secondary, and through the rectifier 33 exciting the feed motor field 26. The inching switch 40 when now manipulated provides a path in one direction or the other for the direct current to actuate the feed motor armature 25 from the rectifier 70 through switch 71 or 72, the electrode feed rheostat 39, switch 73 by-passing rheostat 43, and switch 72 or 71, effecting controlled feed of the electrode 15. The other relays are not energized. When the electrode 15 has been brought into contact with the work 16 by means of the inching switch 40, the starting switch 89 is closed momentarily, energizing the operating relay 88 to close its holding switch 90 and the operating switch 85, through which the feed control relay 77, main relay 82, and time delay relays 54 and 55 are energized. The welding contactor relay 58 is energized upon closing of switch 56 by relay 55 to close the switch 59 to connect welding transformer primary 11 to the alternating current source and cause flow of welding current from the secondary 12 through the electrode and work. At the same time, the feed control relay 77 opens switches 71 and 72 and closes switches 75 and 76, while main relay 82 closes switches 80, 81, and 83 to connect rectifier 70 to secondary 12 and opens switch 79 to deenergize switching relay 78, which opens switches 86 and 87 and switch 73 and closes switch 74 to disconnect the rectifier from the secondary of auxiliary transformer 30 and by-pass rheostat 39 while placing the resistance of voltage control rheostat 43 in the circuit. The feed motor armature 25 is then actuated by direct current from the rectifier 70 flowing through switch 75, switch 74 by-passing rheostat 39, rheostat 43, and switch 76. The travel motor circuit is closed by switch 83 and switch 35, the delayed closing of the latter by relay 54 affording time for initiation of the arc before starting of the travel motor, as in the other form of the invention, and the starting of the travel motor assisting in the generation of the arc, if it has not been initiated, by scratching of the electrode on the work. The welding operation is thus begun and continued as in the case previously described in connection with Fig. 1.

If the electrode 15 has not been brought into contact with the work by the preliminary feeding prior to closing of the starting switch, or if for some reason the arc has been extinguished during the welding operation, the gap between the electrode and work opens the welding circuit and raises the voltage of the secondary 12 to its maximum, above the critical value of high-low voltage relay 24, which is thereupon operated to open switch 23 and deenergize main relay 82, closing switch 79 to energize switching relay 78 and opening switches 80, 81, and 83 to disconnect rectifier 70 from welding transformer secondary 12 and to stop the travel motor. By energization of relay 78, switches 86 and 87 are closed for operation of rectifier 70 from the secondary of transformer 30, switch 73 is closed to by-pass rheostat 43, and switch 74 is opened to put rheostat 39 in the feed motor armature circuit. The armature 25 is then actuated to cause the electrode to be fed slowly into contact with the work, by direct current flowing from rectifier 70 through switch 75, rheostat 39, rheostat-shunting switch 73, and switch 76. Closing of the welding circuit by contact of the electrode with the work causes the voltage of secondary 12 to fall below the critical value of high-low relay 24, which then operates to close switch 23 and consequently energize main relay 82 and deenergize switching relay 78, causing the feed motor armature to be switched back for actuation from the welding transformer secondary 12 and starting the travel motor. The arc is thus established and the welding operation proceeds, as previously described.

When the limit switch 92 is opened upon the end of the desired weld being reached, the relays 88, 77, 82, 54, and 55 are deenergized and the circuit through relay 78 is energized upon closing of its switch 79 by main relay 82. Thus switches 71 and 72 are closed while switches 75 and 76 are opened to disconnect feed motor armature 25 from the rectifier except through the open inching switch 49, so that no current is supplied to armature 25 and the feed motor stops. The switches 35 and 83 are opened to stop the travel motor. The welding contactor relay 58 remains energized for a short time to keep the switch 59 closed and allow welding current to flow and consume enough of the electrode to have it clear the weld, as explained heretofore in connection with Fig. 1, this time being determined by the interval required for the time delay relay 55 to open the switch 56.

What is claimed is:

1. Means for controlling the rates of feed and travel relative to the work of a welding electrode in accordance with a characteristic of the welding current in an alternating current arc welding machine having the electrode and work connected to a source of alternating current supply and separate means for feeding and for causing travel of the electrode relative to the work, comprising a D. C. feed motor to drive the feed means and a D. C. travel motor to drive the travel means with the speeds of said motors substantially fixed relative to said welding current characteristic, and rectifier means connected to the same source and in the same phase as the electrode to derive direct current from the alternating current source and also connected to the motors to supply the direct current thereto for actuation thereby, whereby variations in the value of said welding current characteristic due to fluctuations of the alternating current supply are simultaneously reflected in the direct current and thereby in the motor speeds to maintain said relation.

2. Means for controlling the rates of feed and travel relative to the work of a welding electrode in accordance with a characteristic of the welding current in an alternating current arc welding machine having a welding transformer with a primary connected to a source of alternating current supply and a secondary connected to the electrode and work to pass welding current therethrough and also having separate means for feeding and for causing travel of the electrode relative to the work, comprising a D. C. feed motor to drive the feed means and a D. C. travel motor to drive the travel means with the speeds of said motors substantially fixed relative to said welding current characteristic, an auxiliary transformer with a primary connected to the same source and in the same phase as the welding transformer primary, and rectifier means connected to the secondaries of the transformers to derive direct current from the alternating current source and also connected to said motors to supply the direct current thereto for actuation thereof, whereby fluctuations of the alternating current supply causing deviations from normal of the welding current are simultaneously reflected in the direct current and thereby in the motor speeds to maintain said relation.

3. Means for controlling the rates of feed and travel relative to the work of a welding electrode in accordance with a characteristic of the welding current in an alternating current arc welding machine having a welding transformer with a primary connected to a source of alternating current supply and a secondary connected to the electrode and work to pass welding current therethrough and also having separate means for feeding and causing travel of the electrode relative to the work, comprising a D. C. feed motor to drive the feed means and a D. C. travel motor to drive the travel means having the respective speeds thereof in substantially fixed relation to said welding current characteristic, an auxiliary transformer having a primary connected to the same source and in the same phase as the welding transformer primary, a plurality of rectifiers connected to the secondaries of the transformers to derive direct current from the alternating current source and connectible to said motors to supply the direct current thereto for actuation thereof, and switch means for connecting to the feed motor a rectifier connected to the welding transformer secondary and to the travel motor a rectifier connected to the auxiliary transformer secondary.

4. Means for controlling the rates of feed and travel relative to the work of a welding electrode in accordance with a characteristic of the welding current in an alternating current arc welding machine having a welding transformer with a primary connected to a source of alternating current supply and a secondary connected to the electrode and work to pass welding current therethrough and also having separate means for feeding and causing travel of the electrode relative to the work, comprising a D. C. feed motor to drive the feed means and a D. C. travel motor to drive the travel means with the speeds of the feed and travel motors substantially fixed relative to said welding current characteristic and respectively controlling the feed and travel rates, an auxiliary transformer having a primary connected to the same source and in the same phase as the welding transformer primary, rectifier means including a first rectifier connected to the welding transformer secondary and a second rectifier connected to the auxiliary transformer secondary to derive direct current from the alternating current source, and switch means for selectively connecting the rectifier means to the motors to supply the direct current thereto for actuation thereof, said switch means including means for operatively connecting the first rectifier to the feed motor and the second rectifier to the travel motor during welding operation of the machine.

5. Means for controlling the rates of feed and travel relative to the work of a welding electrode in accordance with a characteristic of the welding current in an alternating current arc welding machine having a welding transformer with a primary connected to a source of alternating current supply and a secondary connected to the electrode and work to pass welding current therethrough and also having separate means for feeding and causing travel of the electrode relative to the work, comprising a D. C. feed motor to drive the feed means and a D. C. travel motor to drive the travel means with the speeds of the feed and travel motors substantially fixed relative to said welding current characteristic and respectively controlling the feed and travel rates, an auxiliary transformer having a primary connected to the same source and in the same phase as the welding transformer primary, rectifier means connected to the secondaries of the transformers to derive direct current from the alternating current source including a first rectifier connected across the welding transformer secondary and a second rectifier connected across the auxiliary transformer secondary, the rectifier means being connectible to said motors for supplying the direct current thereto for actuation thereof, and switch means arranged to connect the feed motor to a rectifier while disconnecting the travel motor from the rectifier means for effecting feeding of the electrode preliminary to establishment of an arc and also arranged to connect the feed motor to said first rectifier and the travel motor to said second rectifier upon contact of the electrode with the work for establishing the arc and actuating said motors.

6. Means for controlling the rates of feed and travel relative to the work of a welding electrode in accordance with a characteristic of the welding current in an alternating current arc welding machine having a welding transformer with a primary connected to a source of alternating current supply and a secondary connected to the electrode and work to pass welding current therethrough and also having separate means for feeding and causing travel of the electrode relative to the work, comprising a D. C. feed motor to drive the feed means and a D. C. travel motor to drive the travel means with the speeds of the feed and travel motors substantially fixed relative to said welding current characteristic and respectively controlling the feed and travel rates, an auxiliary transformer having a primary connected to the same source and in the same phase as the welding transformer primary, rectifier means including a plurality of rectifiers connected to the secondaries of the transformers to derive from the alternating current source and supply to the motors direct current for actuating the motors, and switch means arranged for disconnecting the travel motor from the rectifier means while connecting the feed motor to one of the rectifiers for feeding of the electrode to the work preliminary to establishment of an arc and also arranged for disconnecting the feed motor from the rectifier means while connecting the travel motor to one of the rectifiers upon contact of the electrode with the work to cause relative movement therebetween facilitating striking of an arc and further arranged for connecting both motors one to one of the rectifiers and the other to another rectifier upon striking of an arc to feed the electrode to the arc and to move the electrode relative to the work to produce a desired weld.

7. Means for controlling the rates of feed and travel relative to the work of a welding electrode in accordance with a characteristic of the welding current in an alternating current arc welding machine having a welding transformer with a primary connected to a source of alternating current supply and a secondary connected to the electrode and work to pass welding current therethrough and also having separate means for feeding and for causing travel of the electrode relative to the work, comprising a D. C. feed motor to drive the feed means and a D. C. travel motor to drive the travel means with the speeds of said motors substantially fixed relative to said welding current characteristic, rectifier means connected to the same source and in the same phase as the transformer primary to derive direct current from the alternating current source and including at least one rectifier connected to the transformer secondary, said rectifier means being also connected to said motors to supply the direct current thereto for actuation thereof with the feed motor connected to said one rectifier, and means automatically operable by said welding current characteristic above a predetermined value to disconnect the rectifier from the transformer secondary.

8. In an alternating current arc welding machine having a welding electrode connected to a source of alternating current supply for passage of welding current therethrough, means for causing travel of the electrode relative to the work, and means for feeding the electrode for fusion by the arc, the improvement comprising means for maintaining substantially constant the relation among the rates of fusion, feed, and relative travel of the electrode including a D. C. feed motor for driving the feed means and a D. C. travel motor for driving the travel means with the respective motor speeds controlling the feed and travel rates and substantially fixed relative to a characteristic of the welding current, and rectifier means connected to said source in the same phase as said electrode to derive direct current from the alternating current source and also connected to said motors for supplying the direct current thereto for actuation thereof, whereby the motor speeds correspond to said welding current characteristic throughout welding operation of the machine.

9. In an alternating current arc welding machine having a welding transformer with a primary connected to a source of alternating current supply and a secondary connected to a welding electrode and the work to pass welding current therethrough and also having separate means for feeding and for causing travel of the electrode relative to the work, the improvement comprising means for maintaining substantially constant the relation of the rates of feed and relative travel of the electrode with a characteristic of the welding current including a D. C. feed motor to drive the feed means and a D. C. travel motor to drive the travel means with the respective motor speeds controlling the feed and travel rates and substantially fixed relative to said welding current characteristic, rectifier means connected to the same source and in the same phase as the transformer primary and also connected to said motors to derive direct current from the alternating current source and supply the direct current to the motors for actuation thereof including a rectifier connected to the transformer secondary and to the feed motor, and means for selectively connecting and disconnecting the motors and rectifier means.

10. In an alternating current arc welding machine having a welding transformer with a primary connected to a source of alternating current supply and a secondary connected to a welding electrode and the work to pass welding current therethrough, means for causing travel of the electrode relative to the work, and means for feeding the electrode for fusion by the welding arc, the improvement comprising means for maintaining substantially constant the relation among the rates of fusion, feed, and relative travel of the electrode including a D. C. feed motor to drive the feed means and a D. C. travel motor to drive the travel means with the respective motor speeds controlling the feed and travel rates and substantially fixed relative to a characteristic of the welding current, an auxiliary transformer having a primary connected to the same source and in the same phase as the welding transformer primary, and rectifier means connected to the secondaries of the transformers to derive direct current from the alternating current source and also connected to said motors to supply the direct current thereto for actuation thereof, whereby the motor speeds correspond to said welding current characteristic throughout welding operation of the machine.

11. In an alternating current arc welding machine having a welding transformer with a primary connected to a source of alternating current supply and a secondary connected to a welding electrode and the work to pass welding current therethrough, means for causing travel of the electrode relative to the work, and means for feeding the electrode for fusion by the welding arc, the improvement comprising means for maintaining substantially constant the relation among the rates of fusion, feed, and relative travel of the electrode including a D. C. feed motor to drive the feed means and a D. C. travel motor to drive the travel means with the respective motor speeds controlling the feed and travel rates and substantially fixed relative to normal welding current, an auxiliary transformer having a primary connected to the same source and in the same phase as the welding transformer primary, rectifier means including a first rectifier connected to the welding transformer secondary and a second rectifier connected to the auxiliary transformer secondary to derive direct current from the alternating current source, and switch means for selectively connecting the rectifier means to the motors to supply the direct current thereto for actuation thereof, said switch means including means for operatively connecting the first rectifier to the feed motor and the second rectifier to the travel motor during welding operation of the machine.

12. An alternating current arc welding machine having a welding electrode connected to a source of alternating current supply providing welding current through the electrode for fusion thereof in the welding arc, means for feeding the electrode to the arc, means for causing travel of the electrode relative to the work, a D. C. feed motor for driving the feed means, a D. C. travel motor for driving the travel means, and rectifier means connected to the same source and in the same phase as the electrode to derive direct current from the alternating current source and connected to the motors to supply such direct current thereto for actuation thereof, whereby the rates of feed and relative travel of the electrode determined by the speeds of the respective motors correspond to the rate of electrode fusion determined by the welding current.

13. An alternating current arc welding machine having a welding transformer with a primary connected to a source of alternating current supply and a secondary connected to a welding electrode to pass welding current therethrough for fusion thereof in the arc, means for feeding the electrode to the arc, means for causing travel of the electrode relative to the work, a D. C. feed motor to drive the feed means and a D. C. travel motor to drive the travel means with the speeds of the motors respectively determining the rates of feed and relative travel and substantially fixed relative to normal welding current, and rectifier means connected to the same source and in the same phase as the primary of the transformer to derive direct current from the alternating current source and connected to said motors to supply such direct current thereto for actuation thereof, said rectifier means including a rectifier having its input side connected across the transformer secondary and its output side connected to the feed motor, whereby variations in the normal welding current due to alternating current supply fluctuations are simultaneously and correspondingly reflected in the direct current and thereby the speeds of the motors.

14. An alternating current arc welding machine having a welding transformer with a primary connected to a source of alternating current supply and a secondary connected to a welding electrode to pass welding current therethrough for fusion thereof in the arc, means for feeding the electrode to the arc, means for causing travel of the electrode relative to the work, and means for maintaining a substantially constant relation among the rates of fusion, feed, and relative travel of the electrode comprising a D. C. feed motor to drive the feed means and a D. C. travel motor to drive the travel means with the speeds of the feed and travel motors respectively controlling the electrode feed and travel rates and substantially fixed relative to the normal welding current, an auxiliary transformer having a primary connected to the same source and in the same phase as the welding transformer primary, and rectifier means including a rectifier connected across the welding transformer secondary and another rectifier connected across the auxiliary transformer secondary to derive direct current from the alternating current source and operatively connected to the motors to supply the direct current thereto for actuation thereof, whereby fluctuation in the alternating current supply affect the welding current and the direct current simultaneously and correspondingly.

15. An alternating current arc welding machine having a welding transformer with a primary connected to a source of alternating current supply and a secondary connected to a welding electrode to pass welding current therethrough for fusion thereof in the arc, means for feeding the electrode to the arc, means for causing travel of the electrode relative to the work, and means for maintaining a substantially constant relation among the rates of fusion, feed, and relative travel of the electrode comprising a D. C. feed motor to drive the feed means and a D. C. travel motor to drive the travel means with the speeds of the feed and travel motors substantially fixed relative to the normal welding current and respectively controlling the electrode feed and travel rates, an auxiliary transformer having a primary connected to the same source and in the same phase as the welding transformer primary, rectifier means including a rectifier connected across the welding transformer secondary and another rectifier connected across the auxiliary transformer secondary to derive direct current from the alternating current source and operatively connectible to the motors to supply the direct current thereto for actuation thereof, and switch means for selectively connecting the rectifier means to said motors.

16. An alternating current arc welding machine having a welding transformer with a primary connected to a source of alternating current and a secondary connected to a welding electrode to pass welding current therethrough for fusion thereof in the welding arc, means for feeding the electrode to the arc, means for causing travel of the electrode relative to the work, and means for maintaining a substantially constant relation among the rates of fusion, feed, and relative travel of the electrode to produce a uniform weld comprising a D. C. feed motor to drive the feed means, a D. C. travel motor to drive the travel means, an auxiliary transformer with a primary connected to the same source and in the same phase as the welding transformer primary, rectifier means including a first rectifier connected to the welding transformer secondary and a second rectifier connected to the auxiliary transformer secondary to derive direct current from the alternating current source, and switch means for selectively connecting the rectifier means to said motors to supply the direct current thereto for operation thereof, said switch means including means for operatively connecting the first rectifier to the feed motor and the second rectifier to the travel motor during welding operation of the machine.

17. An alternating current arc welding machine having a welding transformer with a primary connected to a source of alternating current and a secondary connected to a welding electrode to pass welding current therethrough for fusion thereof in the arc between the electrode and the work, means for feeding the electrode to the arc, means for causing travel of the electrode relative to the work, and means for maintaining a substantially constant relation among the rates of fusion, feed, and relative travel of the electrode to produce a uniform weld comprising a D. C. feed motor to drive the feed means, a D. C. travel motor to drive the travel means, an auxiliary transformer with a primary connected to the same source and in the same phase as the welding transformer primary, rectifier means including a plurality of rectifiers connected to the secondaries of the transformers to derive direct current from the alternating current source including one rectifier connected to the welding transformer secondary and another rectifier connected to the auxiliary transformer secondary, the rectifiers also being connected to said motors for supplying the direct current thereto for actuation thereof with said travel motor being connected to said other rectifier, and switch means arranged to connect the feed motor to a rectifier while disconnecting the travel motor from the rectifier means for effecting feeding of the electrode preliminary to establishment of an arc and also arranged to connect the feed motor to said one rectifier and the travel motor to said other rectifier upon contact of the electrode with the work for establishing the arc and actuating said motors.

18. An alternating current arc welding machine having a welding transformer with a primary connected to a source of alternating current and a secondary connected to a welding electrode and to the work to pass welding current therethrough for generating a welding arc therebetween, means for feeding the electrode to the arc for fusion therein, means for effecting travel of the electrode relative to the work, and means for operating the electrode feed and travel means at substantially fixed speeds relative to normal welding current comprising a D. C. feed motor to drive the feed means, a D. C. travel motor to drive the travel means, an auxiliary transformer with a primary connected to the same source and in the same phase as the welding transformer primary, rectifier means including a plurality of rectifiers connected to the secondaries of the transformers to derive from the alternating current source and supply to the motors direct current for actuating the motors, and switch means arranged for disconnecting the travel motor from the rectifier means while connecting the feed motor to one of the rectifiers for feeding of the electrode to the work preliminary to establishment of an arc and also arranged for disconnecting the feed motor from the rectifier means while connecting the travel motor to one of the rectifiers upon contact of the electrode with the work to cause relative movement therebetween facilitating striking of an arc and further arranged for connecting both motors one to one of the rectifiers and the other to another rectifier upon striking of an arc to feed the electrode to the arc and to move the electrode relative to the work to produce a desired weld.

19. An alternating current arc welding machine having a welding transformer with a primary connected to a source of alternating current supply and a secondary connected to a welding electrode to pass welding current therethrough for fusion thereof in the arc, means for feeding the electrode to the arc, means for causing travel of the electrode relative to the work, and means for maintaining a substantially constant relation among the rates of fusion, feed, and relative travel of the electrode comprising a D. C. feed motor to drive the feed means and a D. C. travel motor to drive the travel means with the speeds of the motors respectively controlling the feed and travel rates and substantially fixed relative to a characteristic of the welding current, an auxiliary transformer having a primary connected to the same source and in the same phase as the welding transformer primary, rectifier means connected to the transformer secondaries to derive direct current from the alternating current source and connectible to the motors to supply the direct current thereto for actuation thereof, said rectifier means including a first rectifier connected to the welding transformer secondary and connectible to the feed motor, and second and third rectifiers each connected to the auxiliary transformer secondary connectible respectively to the feed and travel motors, switch means for selectively connecting the feed motor to the first and second rectifiers and the travel motor to the third rectifier, and means operating at a value of said characteristic of the welding current below a predetermined value to cause the switch means to connect the feed motor to the first rectifier and disconnect said motor from the second rectifier and to connect the travel motor to the third rectifier, and automatically operable by said welding current characteristic above said predetermined value for actuating the switch means to disconnect the feed motor from the first rectifier and connect said motor to the second rectifier and to disconnect the travel motor from the third rectifier.

20. An alternating current arc welding machine having a welding transformer with a primary connected to a source of alternating current supply and a secondary connected to a welding electrode to pass welding current therethrough for fusion thereof in the arc, means for feeding the electrode to the arc, means for causing travel of the electrode relative to the work, and means for maintaining a substantially constant relation among the rates of fusion, feed, and relative travel of the electrode comprising a D. C. feed motor to drive the feed means and a D. C. travel motor to drive the travel means with the speeds of said motors respectively controlling the feed and travel rates and substantially fixed relative to the normal welding current, an auxiliary transformer having a primary connected to the same source and in the same phase as the welding transformer primary, and rectifier means connected to the transformer secondaries to derive direct current from the alternating current source and connectible to the motors to supply the direct current thereto for actuation thereof, said rectifier means comprising a first rectifier connected to the feed motor and alternatively connectible to the welding transformer secondary and the auxiliary transformer secondary, and a second rectifier connected to the auxiliary transformer secondary and connectible to the travel motor.

21. An alternating current arc welding machine having a welding transformer with a primary connected to a source of alternating current supply and a secondary connected to a welding electrode to pass welding current therethrough for fusion thereof in the arc, means for feeding the electrode to the arc, means for causing travel of the electrode relative to the work, and means for maintaining a substantially constant relation among the rates of fusion, feed, and relative travel of the electrode comprising a D. C. feed motor to drive the feed means and a D. C. travel motor to drive the travel means with the speeds of said motors respectively controlling the feed and travel rates and substantially fixed relative to the normal welding current, an auxiliary transformer having a primary connected to the same source and in the same phase as the welding transformer primary, rectifier means connected to the transformer secondaries to derive direct current from the alternating current source and connectible to the motors to supply the direct current thereto for actuation thereof, said rectifier means including a first rectifier connected to the feed motor and connectible alternatively to the secondaries of the welding transformer and the auxiliary transformer, and a second rectifier connected to the auxiliary transformer secondary and connectible to the travel motor, and switch means for selectively connecting the first rectifier to the welding transformer and auxiliary transformer secondaries and the second rectifier to the travel motor.

22. An alternating current arc welding machine having a welding transformer with a primary connected to a source of alternating current supply and a secondary connected to a welding electrode to pass welding current therethrough for fusion thereof in the arc, means for feeding the electrode to the arc, means for causing travel of the electrode relative to the work, and means for maintaining a substantially constant relation among the rates of fusion, feed, and relative travel of the electrode comprising a D. C. feed motor to drive the feed means and a D. C. travel motor to drive the travel means with the speeds of said motors respectively controlling the feed and travel rates and substantially fixed relative to a characteristic of welding current, an auxiliary transformer having a primary connected to the same source and in the same phase as the welding transformer primary, rectifier means connected to the transformer secondaries to derive direct current from the alternating current source and connected to the motors to supply the direct current thereto for actuation thereof, said rectifier means including a first rectifier connected to the feed motor and connectible alternatively to the welding transformer and auxiliary transformer secondaries, and a second rectifier connected to the auxiliary transformer secondary and connectible to the travel motor, switch means for selectively connecting the first rectifier to the welding transformer and auxiliary transformer secondaries and the second rectifier to the travel motor, and means operating at a value of said characteristic of the welding current below a predetermined value to cause the switch means to connect the first rectifier to the welding transformer secondary and the travel motor to the second rectifier and automatically operable by said welding current characteristic above said predetermined value for actuating the switch means to disconnect from the welding transformer secondary and connect to the auxiliary transformer secondary said first rectifier and to connect the travel motor to the second rectifier.

References Cited in the file of this patent

UNITED STATES PATENTS

| Number | Name | Date |
| --- | --- | --- |
| 2,025,785 | Southgate | Dec. 31, 1935 |
| 2,132,479 | Holslag | Oct. 11, 1938 |
| 2,488,987 | Schmerber | Nov. 22, 1949 |

FOREIGN PATENTS

| Number | Country | Date |
| --- | --- | --- |
| 439,900 | Great Britain | Dec. 17, 1935 |
| 443,341 | Great Britain | Feb. 26, 1936 |